J. P. FIELD.
PLOW REVERSING MECHANISM.
APPLICATION FILED APR. 28, 1909.
954,567.
Patented Apr. 12, 1910.
2 SHEETS—SHEET 2.
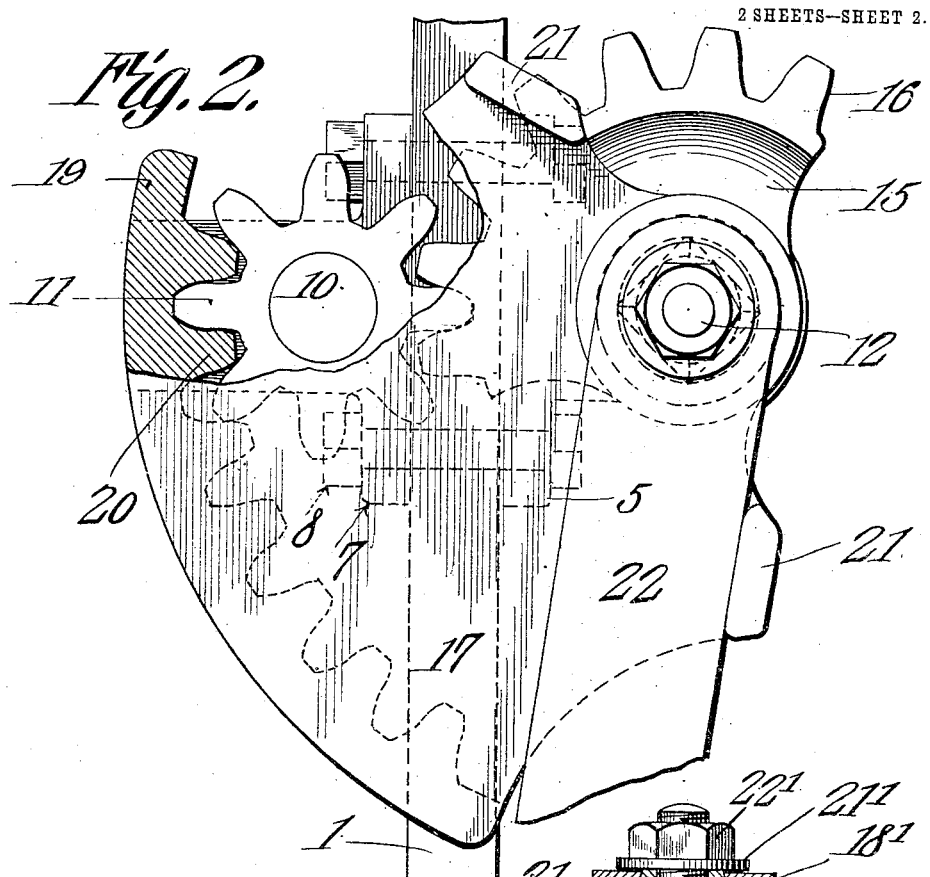
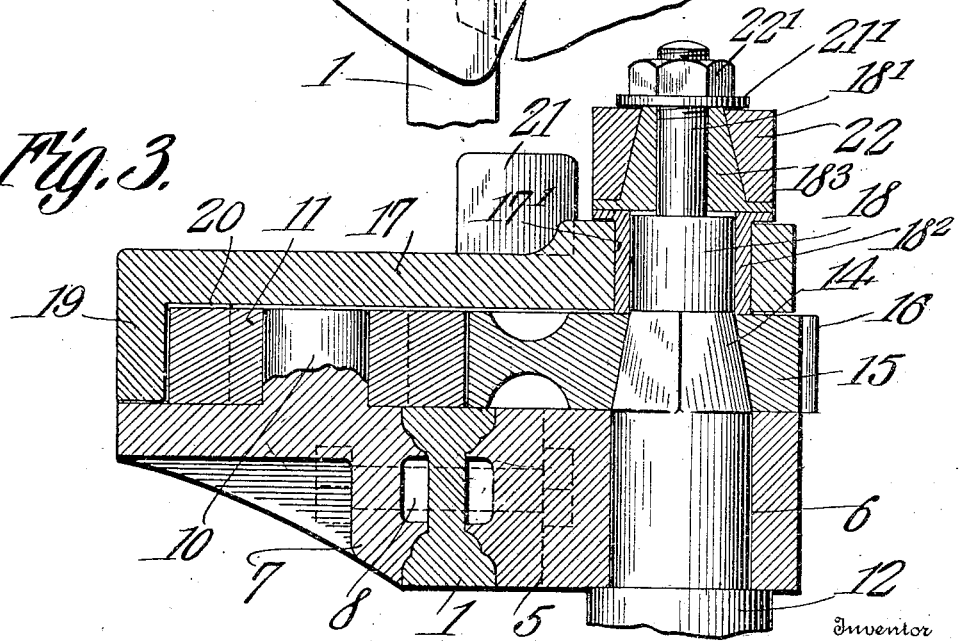
Witnesses
Inventor
James P. Field.
By C. A. Snow & Co.
Attorneys

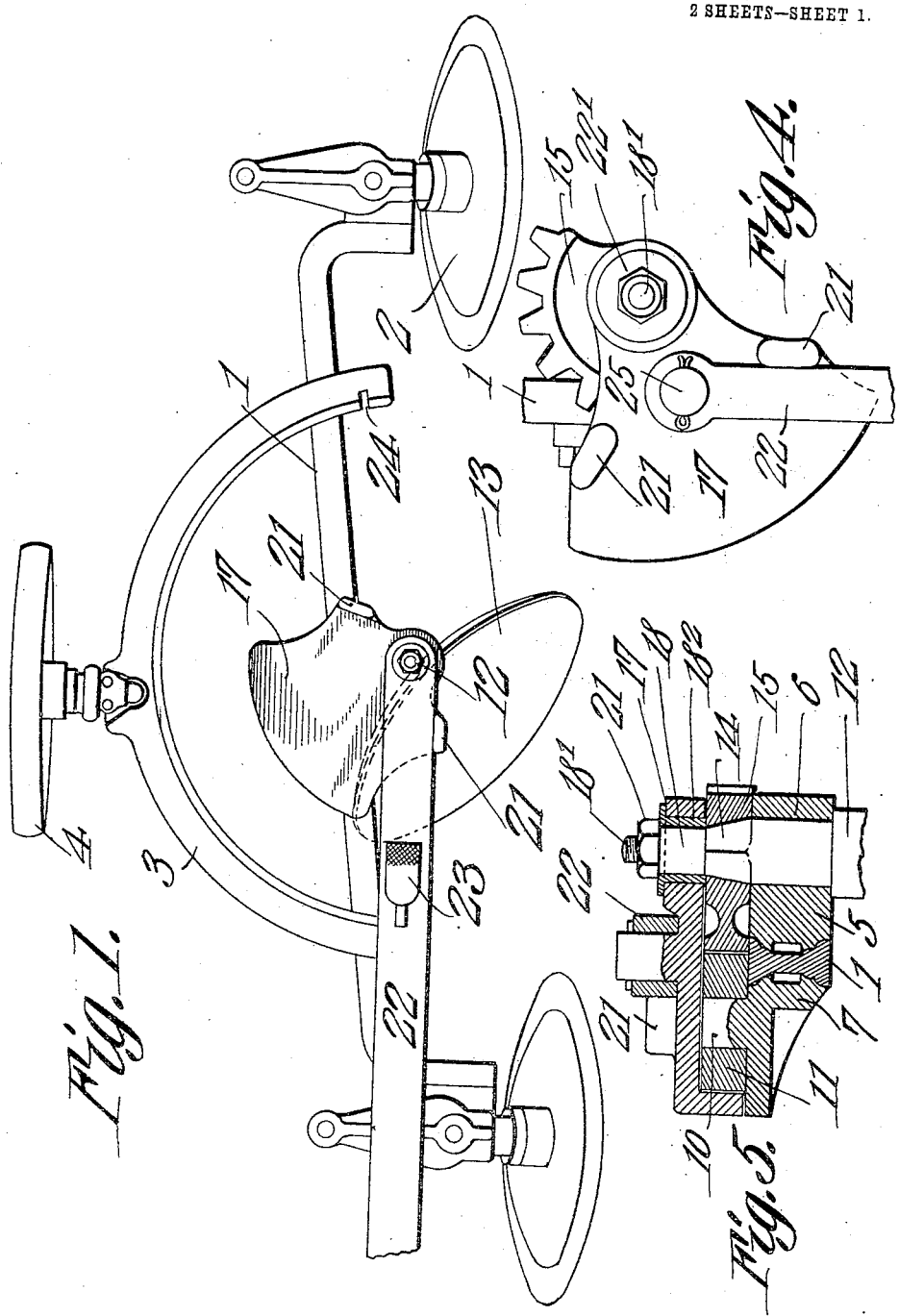

UNITED STATES PATENT OFFICE.

JAMES P. FIELD, OF ATLANTA, GEORGIA.

PLOW-REVERSING MECHANISM.

954,567. Specification of Letters Patent. Patented Apr. 12, 1910.

Application filed April 28, 1909. Serial No. 492,714.

*To all whom it may concern:*

Be it known that I, JAMES P. FIELD, a citizen of the United States, residing at Atlanta, in the county of Fulton and State of Georgia, have invented a new and useful Plow-Reversing Mechanism, of which the following is a specification.

This invention has relation to mechanism for reversing plows, and it consists in the novel construction and arrangement of its parts, as hereinafter shown and described.

The object of the invention is to provide means located between a reversible draft beam and a reversible share or disk, whereby the said share or disk is turned from one position into a reversed position as a result of reversal of the draft beam.

A further object of the invention is to provide a reversing mechanism as stated in which the draft beam is free to swing to reverse in its initial movement, and in its final movement engages said plow-reversing means, whereby the plow, at the final reversing movement of the draft beam, is swung to a reverse position.

In the accompanying drawings:—Figure 1 is a top plan view of a plow having the reversing means attached thereto. Fig. 2 is a top plan view of the reversing means, with parts broken away. Fig. 3 is a vertical sectional view of the plow reversing means. Fig. 4 is a plan view of a modified form of the mechanism. Fig. 5 is a sectional view of the form of mechanism shown in Fig. 4.

In the accompanying drawings the reversing means is illustrated as applied to a disk plow, but the said means may be advantageously applied to moldboard or share plows, if desired.

The plow consists of a frame 1, which is supported at its ends by furrow wheels 2, and which is provided at an intermediate point with an arcuate guide 3. A ground wheel 4 is attached to the guide 3 and is adapted to travel upon the surface of the ground in the usual manner. A bracket 5 is attached to the frame 1 and is provided with a bearing 6, which is concentric with the guide 3. A bracket 7 is attached to the outer side of the frame 1, and the said brackets 5 and 7 are secured in position upon the frame by the bolts 8, which pass transversely through the side of the frame 1 and the said brackets. The bracket 7 is provided upon its upper side with an upstanding pintle 10. A pinion 11 is journaled upon the pintle 10 and rests upon the upper face of the bracket 7.

A standard 12 is journaled in the bearing 6 of the bracket 5, and is provided at its lower end with a disk 13 or a plowshare, as desired. That portion of the standard 12 which projects above the upper surface of the bracket 5 is pyramid-shaped as at 14, and a segment 15 is fixed to the said pyramid-shaped portion of the standard. The segment 15 is provided at its outer portion with gear teeth 16, which mesh with the teeth of the pinion 11. That portion of the standard 12 which projects above the upper surface of the segment 15 is cylindrical as at 18 and a flanged collar $18^2$ constitutes on its outward portion 17′ a journal concentric with the axis of the said standard 12. The lower portion of the collar $18^2$ rests upon the upper surface of the segment 15 and the upper portion of the said collar $18^2$ is flanged so as to form a washer and a segment plate 17 surrounds the said collar below the said flange. The portion 18′ of the standard 12 which projects above the cylindrical portion 18 of the standard is also cylindrical but is threaded at its upper portion to receive a nut 22′ and also a washer 21′. Said washer 21′ bears against the upper face of the collar $18^3$ and the upper face of the draft beam 22. A flanged collar $18^3$ surrounds the cylindrical portion 18′ of the standard 12 and rests upon the upper face of the collar $18^2$, contacting with and fitted to the under face of the draft beam 22 and the under face of the washer 21′. The lower portion of the said collar $18^3$ being flanged and extended to fit upon the flange portion of the collar $18^2$. The outer surface of the collar $18^3$ may be either cylindrical or conical and forms a journal for the bearing formed in the end of the draft beam 22. Said bearing of said draft beam 22 being made to conform to the said outer surface of the said flanged collar $18^3$. Said outer surface of said flange collar $18^3$ is concentric with the axis of the standard 12. Said beam 22 may be journaled upon a pintle 6 on the upper surface of said segment plate 17 and away from the axis of said standard 12 or of said segment plate 17 in the manner as illustrated in Figs. 4 and 5 of the drawings. The shoulder on the upper portion of the cylindrical portion 18 of the standard 12 is intended not to engage with the lower face of the collar 18³ but leaves said collar 18³ free to press down the collar 18² upon the segment 15 so as to hold said segment 15 firmly down in fixed relation to the standard 12. The said flanged collars 18² and 18³ may if preferred be made in one piece. The plate 17 is provided at its outer edge with a depending flange 19 upon the inner face of which is concentrically arranged a set of gear teeth 20, which mesh with the teeth of the pinion 11 at the opposite side of the said pinion from that side thereof which meshes with the teeth 16 of the segment 15. The segment plate 17 is provided upon its upper side and at its edges with upstanding lugs 21. A draft beam or tongue 22 is pivotally mounted upon the upper end 18' of the standard 12, and is arranged to swing over the surface of the plate 17, and when it arrives in the vicinity of the edges of the said plate 17, the said beam 22 engages the inner faces of the lugs 21. A catch 23 is mounted upon the tongue 22, and when the said tongue is in the vicinity of the end of the guide 3, the said catch enters the perforations 24, provided at the end portions of the said guides, whereby the said tongue 22 is temporarily held in fixed relation to the guide 3.

From the above description it is obvious that when the draft beam 22 is swung around upon the guide 3 during the act of reversing the plow, in its initial movement, the said draft beam or tongue 22 will leave one of the lugs 21, carried by the plate 17, and will move toward the other lug 21 upon the said plate. When the said draft beam 22 nearly completes its reversal movement it engages that lug 21 to which it is moving and turns the said plate 17 during the final reversing movement on the part of the said beam. As the said plate 17 swings upon the axis of the standard 12, the teeth 20 carried by the said plate 17 rotate the pinion 11, which, in turn, swings the segment 15 upon the axis of the standard 12. Inasmuch as the said segment 15 is fixed to the standard 12, the said standard is turned and the plow 13 carried at the lower portion thereof is swung from one position into a reverse position. As the draft beam 22 is swung in a direction opposite from that above described, the plow 13 is moved to a reverse position from that originally occupied.

By this arrangement it will be observed that in its initial movement the draft beam 22 does not actuate or move the plate 17, and, consequently, the draft animals may be directed laterally with relation to the frame 1, and the movement of the draft beam 22 may be gotten well under way before the said beam will actuate the plow-reversing means. At the same time, it will be observed that the parts are so arranged that they may be located at opposite sides of the frame 1, and, consequently a compact arrangement is effected.

In the form of the invention as illustrated in Figs. 4 and 5 of the drawing an upstanding pintle 25 is formed as a part of the plate 17 and the rear end of the beam 22 is pivoted upon the pintle 25 instead of upon the upper end of the standard 12 as shown in the other figures of the drawing. In the modified form it will be seen that the rear end of the beam 22 lies between the lug 21 mounted upon the plate 17 and that as the said beam 22 is swung upon the pintle 25 the parts are operated in a manner similar to that described in connection with the structure revealed in Figs. 1, 2, 3 of the drawing.

Having described my invention, what I claim as new, and desire to secure by Letters Patent is:—

1. A reversible plow comprising a journaled standard, a segment fixed to the standard, a segment plate journaled upon a collar which is fixed upon the standard and having spaced lugs, a draft beam pivoted upon the standard and lying between the lugs of said segment plate, a pinion journaled upon a fixed support and meshing with said segment and said segment plate.

2. A reversible plow comprising a journaled standard, a segment fixed to the standard, a segment plate pivotally movable upon the standard, a journaled pinion operatively connecting the segment with the segment-plate, said segment plate having spaced lugs, and a draft beam pivoted upon the standard and lying between the lugs of the segment plate.

3. A reversible plow comprising a bracket having a bearing, a standard journaled in the bearing, a second bracket having a pintle, a segment fixed to the standard, a pinion journaled upon said pintle, a segment plate pivoted upon the standard, said pinion operatively connecting the segment with the segment plate, said segment plate having spaced lugs, and a draft beam pivoted upon the standard and lying between the lugs carried by said segment plate.

4. In a reversible plow a journaled standard, a segment attached thereto, a beam-operated segment plate and an intermediate journaled pinion operatively connecting the segment and segment-plate.

5. A reversible plow comprising a journaled standard, a segment fixed to the standard, a journaled pinion meshing with the segment, a superimposed segment-plate meshing with the pinion and means for operating the segment plate.

6. A reversible plow comprising a journaled standard, a collar journaled upon the standard, a segment fixed to the standard, a segment-plate journaled upon the collar a journaled pinion operatively connecting the segment-plate and segment and means for operating the segment plate.

7. A reversible plow comprising a journaled standard, a collar fitted upon the standard, a segment fixed to the standard, a segment-plate journaled upon the collar and having spaced lugs, a journaled pinion operatively connecting the segment plate and segment, and a pivoted beam arranged to swing between said lugs.

8. A reversible plow comprising a journaled standard, a segment fixed to said standard, a pivoted segment plate on the axis of said standard and having spaced lugs, a reversing beam pivoted above the upper surface of the segment plate and lying between said lugs, and a pinion operatively connecting said segment and said segment-plate.

9. A plow comprising a journaled standard, a segment fixed to the standard, a segment plate pivoted upon the axis of the standard, means operatively connecting the segment and segment-plate, and a reversible beam for operating the segment-plate.

10. A plow comprising a journaled standard, a segment fixed to the standard, a segment-plate located above the segment, a journaled pinion operatively connecting the segment-plate with the segment, and housed by the segment-plate, and a reversible draft means for operating the segment-plate.

11. A reversible plow comprising a journaled standard, a segment fixed to the standard, a segment-plate pivoted upon the axis of the standard, a reversing beam pivoted upon the axis of the standard and adapted to operate the segment-plate, and means operatively connecting the segment-plate with the segment.

In testimony that I claim the foregoing as my own, I have hereto affixed my signature in the presence of two witnesses.

JAMES P. FIELD.

Witnesses:
   F. L. Berry,
   O. M. Stacy.